Aug. 30, 1938.         D. A. YOUNG ET AL         2,128,277
             DETACHABLE MOUNTING FOR INSTRUMENTS
                      Filed March 20, 1937
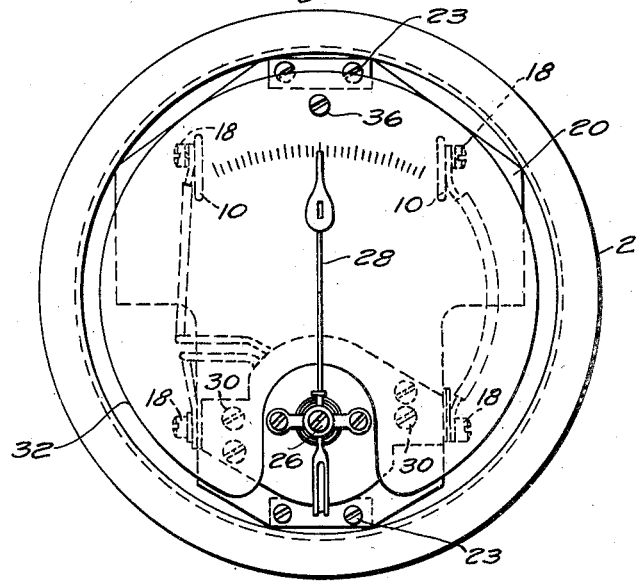
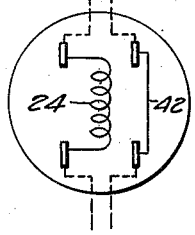 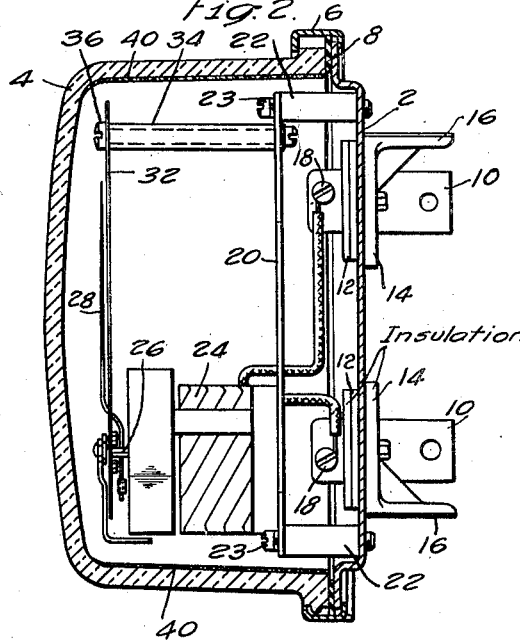 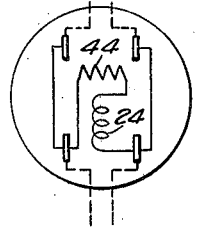
WITNESSES:
INVENTORS
Paul MacGahon and
Douglass A. Young.
BY
ATTORNEY Patented Aug. 30, 1938

2,128,277

UNITED STATES PATENT OFFICE 2,128,277

DETACHABLE MOUNTING FOR INSTRUMENTS

Douglass A. Young, East Orange, and Paul MacGahan, Orange, N. J., assignors to Westinghouse Electric & Manufacturing Company, East Pittsburgh, Pa., a corporation of Pennsylvania Application March 20, 1937, Serial No. 132,078

6 Claims. (Cl. 171—95)

The present invention relates to an improved mounting for electrical indicating instruments, and particularly, to a mounting of the so-called detachable type in which the mounting of the meter on its support automatically makes the proper circuit connections to the instrument movement.

In the watthour meter art, the detachable type of mounting has met with considerable commercial success and it is an object of the present invention, broadly stated, to adapt the detachable watthour meter construction to the mounting of indicating instruments.

The detachable watthour mounting is shown, for example, in U. S. Patent 1,969,499, issued August 7, 1934, to W. M. Bradshaw, et al. It comprises, in general, an encased meter element having contact blades projecting from the base of the casing for cooperation with contact jaws mounted in a separate receptacle, or upon a support, and which are connected to the circuit to be metered. In view of the widespread acceptance of this construction by industry in general, it is proposed to modify it to the extent that indicating instruments, of the ammeter and volt meter type for example, may be mounted therein and thereby obtain the convenience and advantages of the detachable mounting for the installation of indicating instruments.

Other objects of the invention will be apparent from the following description and accompanying drawing, in which:

Fig. 1 is a view in front elevation of an instrument mounting in accordance with the present invention;

Fig. 2 is a view in vertical section of the structure shown in Fig. 1; and

Figs. 3 and 4 are diagrammatic illustrations of various circuit connections to be made with the movement shown in the preceding figures to adapt it to different types of measurement.

Referring more particularly to Figs. 1 and 2, the instrument casing comprises a base plate 2 and a transparent cover 4 suitably clamped thereto by a sealing ring 6 with a gasket 8 interposed between the cover and base. The clamping ring 6 and its relation to the cover and base are shown and described in detail in the aforesaid Patent No. 1,969,499, and further description is not considered necessary.

Contact blades 10 are secured to the base 2 in a manner to project rearwardly thereof for cooperation with suitable contact jaws in a support with which the instrument is to be associated. The blades 10 each comprise a flat strip extending through a slot in the base and insulated therefrom by suitable washers 12 on the interior of the base, and washers 14 on the rear of the base, each having an upturned portion 16 to prevent the blades from contacting adjacent metal structures when they are being inserted in the contact jaws. The inner portion of each blade 10 is provided with screws 18 for making the necessary terminal connections within the instrument casing.

An auxiliary base plate 20 is supported on the inner face of the base 2 by means of spacing posts 22 and screws 23 at opposite sides of the plate 20. The posts 22 are of sufficient length to space the plate 20 from the terminal screws 18 a desired amount.

Referring to Fig. 1, it will be noted that the plate 20 has cut away portions in the lower half thereof to clearly expose the lower terminal screws 18 so that connections to them may be readily made, and so that leads from the instrument movement may be brought beneath the plate to make the connections to the various screws 18 without crowding such leads.

The instrument movement shown, by way of example, is of the repulsion vane type having a winding 24 enclosing a chamber in which the moving and stationary vanes are disposed, the moving vane operating, through a shaft 26, an indicating pointer 28. The specific construction of the instrument movement is not of importance with respect to the present invention, it being contemplated that any standard or well known movement may be substituted for the one shown. The coil and its support are secured to the base 20 by means of screws 30 in a desired manner.

The indicating pointer 28 cooperates with a scale plate 32 which is secured at its lower end to the instrument movement and at its upper end to the base 20 by means of a post 34 and screw 36.

As indicated in Fig. 2, the side walls of the glass cover 4 are made translucent, as by painting or applying a desired coating 40, in order to mask the interior of the instrument to provide a more pleasing appearance and to facilitate reading the instrument by focusing attention upon the scale plate 32 exposed from the front of the casing.

As indicated in Fig. 3, the connections to the winding 24 may be made between an upper and lower contact blade 10 in series with one side of the circuit, and a jumper 42 applied between the two remaining terminals. With this connection the instrument movement is connected to read amperes.

In Fig. 4, connections are shown for using the instrument movement as a volt meter. In this case it is desirable to use a resistor 44 in series with the winding 24 so that it may be connected across the circuit.

Various other connections may be made to measure desired electrical quantities if the proper types of resistors, voltage multipliers, etc., are employed. In such cases, the various resistors, etc., may conveniently be mounted upon the auxiliary base plate 20 above the instrument movement so that the entire instrument with its auxiliary equipment is enclosed by the cover 4.

Equipment of the type described is quite flexible in its operation. For example, a machine in an industrial plant may be equipped with a single set of contact jaws for receiving any of a number of instruments of the type shown, including ammeters, volt meters, wattmeters, etc. To read a particular electrical quantity, it is merely necessary to plug the desired instrument into the single set of contact jaws, without having to manipulate connections to the instrument. Further, this type of installation permits the ready removal of an instrument for inspection, repair or replacement.

Quite apparently, modifications may be made in the structure shown without departing from the invention, and it is desired that the latter be limited only by the scope of the appended claims.

We claim as our invention:

1. In an instrument mounting, a substantially circular base having contact blades projecting from one side thereof and terminals for said blades accessible from the other side thereof, a plate of smaller lateral dimensions than said base and means for supporting it parallel to said base and spaced from said terminals, an indicating instrument movement and means for securing it to said plate, electrical connections between certain of said terminals and said movement, and a cover of transparent material enclosing said movement and plate and secured to the periphery of said base, said plate having portions thereof removed adjacent to certain of said terminals to facilitate the electrical connections thereto.

2. In an electrical instrument mounting, a substantially circular base having four contact blades projecting rearwardly therefrom and terminals for said blades exposed on the front of the base, a plate supported parallel to the base and spaced from said terminals, an electrical indicating instrument movement mounted on the front of said plate, conductors extending from said movement to two of said terminals and a jumper connecting the other two terminals, a portion of said plate being removed to facilitate the extending of said conductors from the movement, beneath the plate, and to said terminals, and a cover of cup shape having a transparent bottom enclosing said movement and plate and secured at its periphery to said base.

3. In an instrument mounting, a substantially circular base having contact blades projecting from one side thereof and terminals for said blades accessible from the other side thereof, a plate of smaller lateral dimensions than said base and means for supporting it parallel to said base and spaced from said terminals, an indicating instrument movement and means for securing it to said plate adjacent to one side thereof, a dial for said movement secured at one side to the face of the movement and secured at its opposite side to said plate in spaced relation with respect thereto to define a space between the dial and plate for the reception of calibrating devices for said movement, electrical connections between certain of said terminals and said movement, and a cover enclosing said movement, dial and plate and secured to the periphery of said base.

4. In an instrument mounting, a substantially circular base having contact blades projecting from one side thereof and terminals for said blades accessible from the other side thereof, a plate of smaller lateral dimensions than said base and means for supporting it parallel to said base and spaced from said terminals, said plate having a portion thereof removed adjacent to one of said terminals, an indicating instrument movement secured to said plate adjacent to one side thereof, a substantially circular dial overlying said plate in spaced relation with respect thereto and secured at spaced points to a portion of said movement and to said plate, respectively, to define a space between the dial and plate within the area of the plate for the reception of calibrating devices for said movement, and an electrical connection extending from said movement to one of said terminals past the point on the plate where said portion was removed.

5. In an instrument mounting, a base having contact blades projecting from one side of said base and terminals for said contact blades accessible on the other side of said base, a cover for said base having a face portion above said base and a wall portion adjacent said base for enclosing a space capable of receiving variously sized instruments, a mounting plate within said space, means for supporting said plate in substantially parallel and spaced relationship to said base, an instrument movement substantially smaller than said space and positioned adjacent a wall portion of said cover, means for securing said instrument movement to said plate, and electrical connections between certain of said terminals and said movement.

6. In an instrument mounting, a base having contact blades projecting from one side of said base and terminals for said contact blades accessible on the other side of said base, a cover for said base having a face portion above said base and a wall portion adjacent said base for enclosing a space capable of receiving variously sized instruments, a mounting plate within said space, means for supporting said plate in substantially parallel and spaced relationship to said base, an instrument movement substantially smaller than said space and positioned adjacent a wall portion of said cover, means for securing said instrument movement to said plate, the assembly comprising said instrument movement and said plate overlying at least a portion of said terminals, a member movable by said instrument movement and having a dimension substantially larger than a corresponding dimension of said movement, and electrical connections between certain of said terminals and said movement.

DOUGLASS A. YOUNG.
PAUL MacGAHAN.